US006343990B1

(12) United States Patent
Rasmussen et al.

(10) Patent No.: US 6,343,990 B1
(45) Date of Patent: Feb. 5, 2002

(54) ENTERTAINMENT SYSTEM OFFERING MERIT-BASED REWARDS

(75) Inventors: Sean Rasmussen, Halifax (CA); Paul Donovan, 1668 Barrington Street, Apt. 500, Halifax, Nova Scotia (CA), B3J 2A2

(73) Assignee: Paul Donovan, Halifax (CA)

( * ) Notice: Subject to any disclaimer, the term of this patent is extended or adjusted under 35 U.S.C. 154(b) by 0 days.

(21) Appl. No.: 09/492,125

(22) Filed: Jan. 27, 2000

(51) Int. Cl.[7] .................................................. A63F 9/24
(52) U.S. Cl. ......................................... 463/25; 463/42
(58) Field of Search ........................... 463/1, 9, 40–42, 463/30, 29, 36, 35, 25; 273/429–430, 459–460; 434/307 R, 308, 309; 700/91–92

(56) References Cited

U.S. PATENT DOCUMENTS 5,586,257 A * 12/1996 Perlman ...................... 463/12
5,983,196 A * 11/1999 Wendkos ..................... 705/14

OTHER PUBLICATIONS

Humor Database, 14 sheets, printed Nov. 9, 1999, Located at Humor Database Dot Com.
Win Prizes, 13 sheets, printed Nov. 23, 1999, Located at Elol Dot Com Slash Points Contest Dot HTM.

* cited by examiner

*Primary Examiner*—Mark Sager
(74) *Attorney, Agent, or Firm*—Blake, Cassels & Graydon

(57) ABSTRACT

An entertainment system comprising in one embodiment an Internet site configured to enable participants to submit content, such as jokes, and view the submissions of others. The site also enables participants to cast a vote for the best content, e.g., the best joke, with each visit. The votes are redeemable for cash or free access to the site. The payout to participants is preferably funded by charging a fee for accessing the site. This permits participants to be rewarded for the quality of their submissions as judged by others. In another embodiment the Internet site hosts a game, such as a video game. The highest scores are tracked and expert players are identified. The system enables novice players who wish to expand their knowledge of the game to view the play of more skilled players, who receive a portion of the access fees paid by all players. This enables players to be rewarded for their skill.

27 Claims, 12 Drawing Sheets

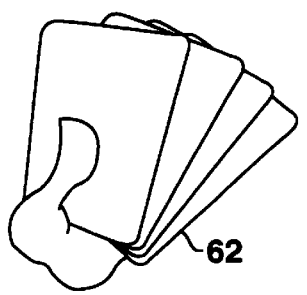 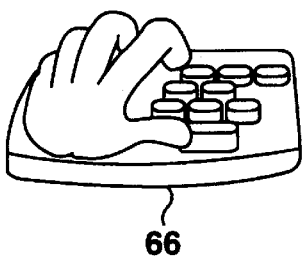 

By category     By keyword     By poster

| Joke Categories | | | | | |
|---|---|---|---|---|---|
| Listings | Ten Latest Jokes | Top Ten Jokes Last Week | | New unread Jokes | |
| | Top Ten Jokes Last Week | Top Ten Jokes | | All Jokes | |
| Categories | Business 2 | Education 0 | Insults 3 | Miscellaneous 8 | Puns 3 | Show Biz 1 |
| | Computer 3 | Ethnic 2 | Lawyers 19 | News 0 | Relationships 5 | Sports 1 |
| | Dirty 21 | Gender 4 | Lightbulb 3 | Politics 2 | Region 8 | Stupid 7 |

Keyword(s) [ ] [Show matching jokes]

Jokester [ ] [Show matching jokes]

FIG. 3D

| Joke Categories/Lawyers | | | post jokes here |
|---|---|---|---|
| Listings | Ten Latest jokes | Top Ten jokes Last Week | New unread jokes |
| | Top Ten jokes Last Week | Top Ten jokes | All jokes |
| Categories | *No categories under this one.* | | | next joke list ▶▶

Posted by blue on Nov 03, 1999.
Rating: Adult   Votes: 0   Complaints: 0
Joke categories / Lawyers

[ joke 1 ]

vote complain e-mail

Posted by blue on Nov 03, 1999.
Rating: Adult   Votes: 0   Complaints: 0
Joke categories / Lawyers

[ joke 2 ]

vote complain e-mail

Posted by blue on Nov 03, 1999.
Rating: Adult   Votes: 0   Complaints: 0

FIG. 3E

View By Date | View By # of Times Read | View By # of Votes | View By # of Complaints You only have one active joke.

| Post Date | Readings | Votes | Complaints |
|---|---|---|---|
| Thursday November 25, 1999. 12:20 P.M. | 0 | 0 | 0 |
| [ Joke ] | | | |
| Totals | Readings | Votes | Complaints |
| | 0 | 0 | 0 |

132a  132b  132c

You currently have no inactive postings.

You may change any of the information fields below, except your username.

All fields in bold must be filled out.

You may have an e-mail receipt sent to you by checking the box at the bottom of the form.

Credit card information cannot be changed here, but you may submit new credit card information with this form.

140

| Username | apo@blakes.ca |
| --- | --- |
| First name | Alex |
| Middle Initial | |
| Last Name | Porat |
| Password | |
| Password (confirm) | |
| Email | apo@blakes.ca |
| Alias | Blakemaster |
| Rating Level | Steamy  142 |
| *Payment Address* | |
| Street Address | |
| City | |
| State / Province | |
| Country | United States |
| Zip / Postal Code | |

☐ Email Receipt Of My Changes?  [reset] [register]

| *Password* | This is your secret password. Keep it safe. Please repeat it, just to confirm. |
| --- | --- |
| *Your Alias* | You should choose an 'alias'- a sort of 'pen name' which will be the author name shown under your jokes. |
| *Rating* | What sort of jokes do you want to see?<br><br>There are currently the following content rating levels: choose one of them above, and you will only see jokes that are at this level or below.<br><br>| Rating | Comments |<br>| --- | --- |<br>| Steamy | Something to offend anyone. |<br>| Adult | Not really suitable for under 16 |<br>| General | OK For Everyone | |

FIG. 3G

If you have changed your credit card, please enter all the info below. For security reasons, your current credit card information cannot be displayed.

Your new card with be verified immediately.

| Type | Choose Credit Card Type ▾ |
| Number | |
| Expiry | |
| Name On Card | |
| | clear    update info |
| Name On Card | Please ensure that is the exact name the appears on the card. |

ENTERTAINMENT SYSTEM OFFERING MERIT-BASED REWARDS

FIELD OF INVENTION

The invention generally relates to the field of entertainment, and more particularly to an Internet-based entertainment application which offers participants the opportunity to win or earn cash and prizes.

BACKGROUND OF INVENTION

The number of sites on the world wide web (WWW) has grown to such an extent that 'surfing the net' has become a hobby and a form of entertainment unto itself Today, Internet users can conveniently shop, bank, invest, play on-line games, and gamble, not too mention obtain news, music and information on just about any topic over the Internet. Indeed, the Internet has become so versatile that it has often been dubbed as the 'new media'.

One goal of many Internet content providers is to attract as many visitors as possible to their sites. This is particularly important for content providers whose businesses are based at least in part on an advertising model. In this model, the content provider places sought-after or popular content on its web site which typically may be freely accessed by visitors. Each web page is typically associated with an advertising banner so that visitors simultaneously view advertisements while accessing the site. Advertisers pay the content provider for the privilege of having the advertisements shown on the popular site. Examples of companies which employ this business model include the so called 'portal' companies such as Yahoo Inc. and Lycos Inc. which, among other items, offer free search engines for finding content on the web.

Some content providers elicit at least a portion of the very content they publish or distribute over the Internet from persons accessing or using their sites. This may occur with web sites which offer discussion groups or forums relating to investing, cooking, gardening or other such leisure activity, or with web sites which provide literature, music or humour to visitors. Such sites may employ various means to encourage user participation and contribution of material. For instance, NetCustomize Corporation of New York, N.Y. offers a free joke service at www.elol.com through which participants (i.e., persons who have directly or indirectly registered at the site) may periodically receive jokes electronically according to user-settable parameters. Participants are encouraged to submit jokes to the site through the use of a reward scheme. More particularly, a contest is held for the best submitted joke in a given month and the winner is awarded a cash prize. Participants also receive loyalty points based on the number and quality of jokes they submit. Those who have accumulated a predetermined number of points are entered into a random draw contest with the winner receiving a cash prize.

The above scheme for encouraging participation in an entertainment application and others like it typically set the prizes available to be won at a relatively modest level. For instance, prizes typically range in the few hundred to perhaps a few thousand dollars, with only the most popular sites being able to offer very large prizes. With the phenomenal growth of the internet, both in terms of the number of users as well as the number of content providers, such schemes for attracting user participation have their limits. This is because the prizes available to potential participants are relatively modest enough so as to not make it worthwhile for individuals to bother to participate. Furthermore, the contest-based approach to attracting users and encouraging their contributions necessarily means that only a relatively small number of individuals will win any prizes. Given that the chances for winning a prize are relatively small, there may not be sufficient incentive to attracting users and maintaining their participation.

SUMMARY OF INVENTION

The invention seeks to overcome various limitations of the prior art. Generally speaking the invention provides a method and system for entertaining persons over the Internet or other such computer network and enabling them to win or earn cash or prizes based on how other participants perceive them in a particular activity or endeavour. In this sense the system offers rewards based on the participant's effort or merit.

According to one broad aspect of the invention, an Internet site is provided which is configured to enable a given participant to interact therewith in a predefined manner and to enable other participants to view the given participant's interaction with said site. Each participant is granted credits based on his or her participation level with the site. A given participant is able to transfer his or her credits to another participant. Each user is able to periodically exchange accumulated credits, if any, for valuable consideration such as cash or prizes.

In one variant of the invention, the Internet site functions as a forum where participants may post or submit content to the site and view the submissions of others.

In the embodiment of this variant exemplified herein, the topic of the forum is humour, and the Internet site is configured to enable participants to submit jokes or other amusing works as well as view what has been submitted by others. In the exemplified embodiment, participants are charged a fee for accessing the Internet site. The access fees paid by each participant determines the amount of credit that individual receives. In this sense, the access fees represent the participation level of each user. Each participant also receives the ability to cast votes, wherein each vote represents a predetermined number of credits. Participants may cast one or more votes for any joke, and the participant who has submitted a voted-for joke will receive the corresponding vote. This enables participants to accumulate votes received from others and redeem them for cash or free access to the site. In this manner a given participant is able to transfer his or her credits to another participant as a reward for the quality (or perhaps lack thereof!) of the other participant's submissions.

The exemplified embodiment thus simultaneously provides two sometimes contradictory objectives for encouraging participation. On the one hand, if a participant submits a wickedly funny joke (or other item in a different forum), he or she has the potential to accrue many votes and hence redeem substantially more money than what it cost the participant to play. On the other hand, because each participant is able to redeem accumulated votes, each participant has the potential for winning or earning something. This will ameliorate the futility felt by the unlucky majority in winner-take-all contests.

In another variant of the invention, the Internet site is configured to enable participants to interact with a video game hosted on the site. In the embodiment exemplified herein of this variant, participants are charged a fee for accessing the Internet site. Once they have entered the site, each participant may separately and individually play the hosted video game. The score of each player is recorded and stored. Other players are notified of the highest scores and the identity of the corresponding participants. However, the ability for a first participant to view a second participant's game play is blocked unless the first participant has transferred a predetermined amount of credit to the second participant. In this manner, participants who are good at playing the game can achieve financial reward by garnering a paying audience who wish to see or learn how to play the game to its full extent.

BRIEF DESCRIPTION OF DRAWINGS

The foregoing and other aspects of the invention are discussed in greater detail below with reference to the accompanying drawings, provided for the purpose of description and not of limitation, wherein:

FIGS. 3A–3H illustrate various user interface screens or web pages employed by the first exemplary embodiment of the entertainment system;

DESCRIPTION OF EXEMPLARY EMBODIMENTS

Figure 1:
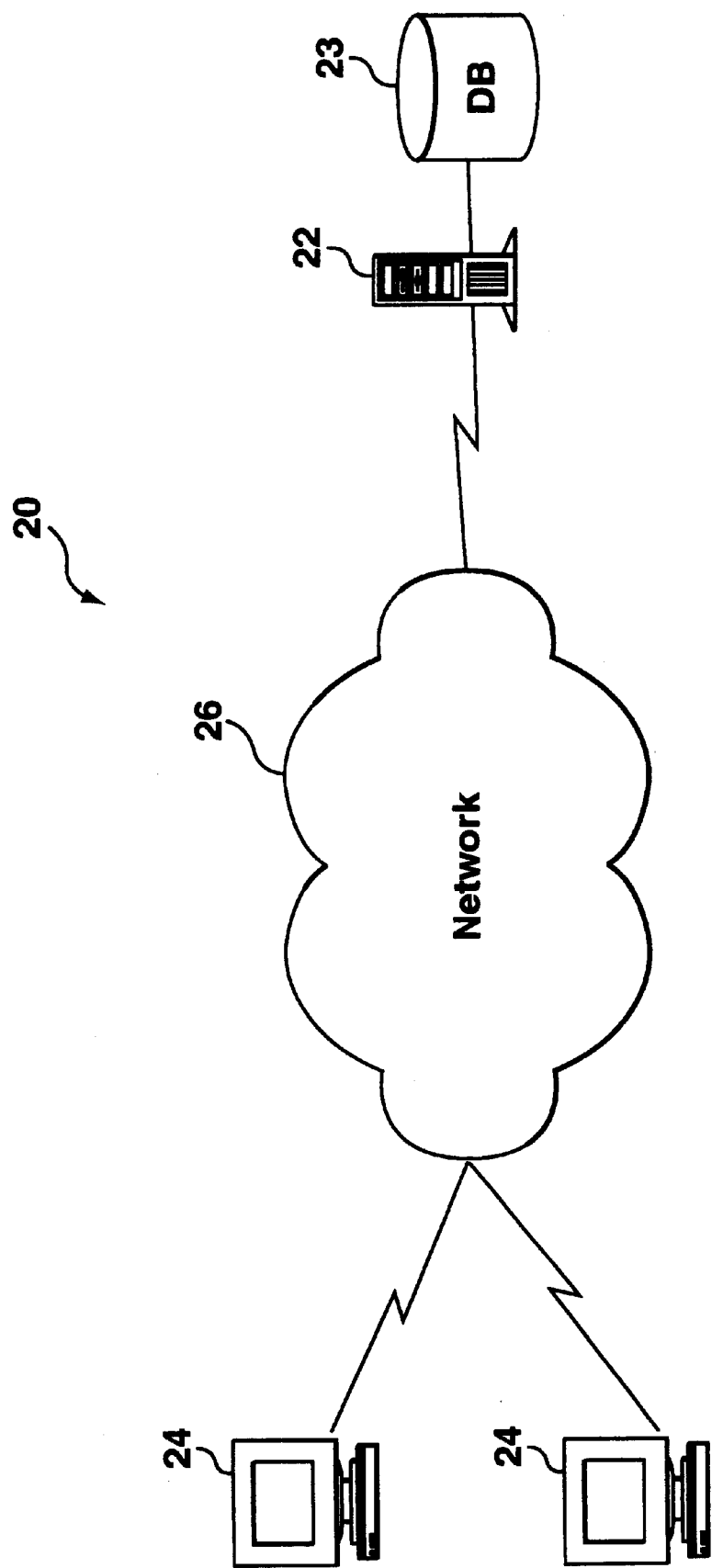
FIG. 1 is a schematic diagram illustrating the physical components of an entertainment system.

FIG. 1 shows the physical components of an entertainment system 20 which comprises a server 22 including a relational database 23 which stores various data used in the operation of the system, as discussed in greater detail below. The server 22 is connected to a plurality of client computers 24 via a computer network 26 such as the Internet. In the embodiments described herein, server 22 is accessible as a site on the world wide web and comprises the primary processing logic of the system. The client computers 24 run browser software in order to view the web site and interact with the server 22, all as known per se in the art.

Figure 2A:
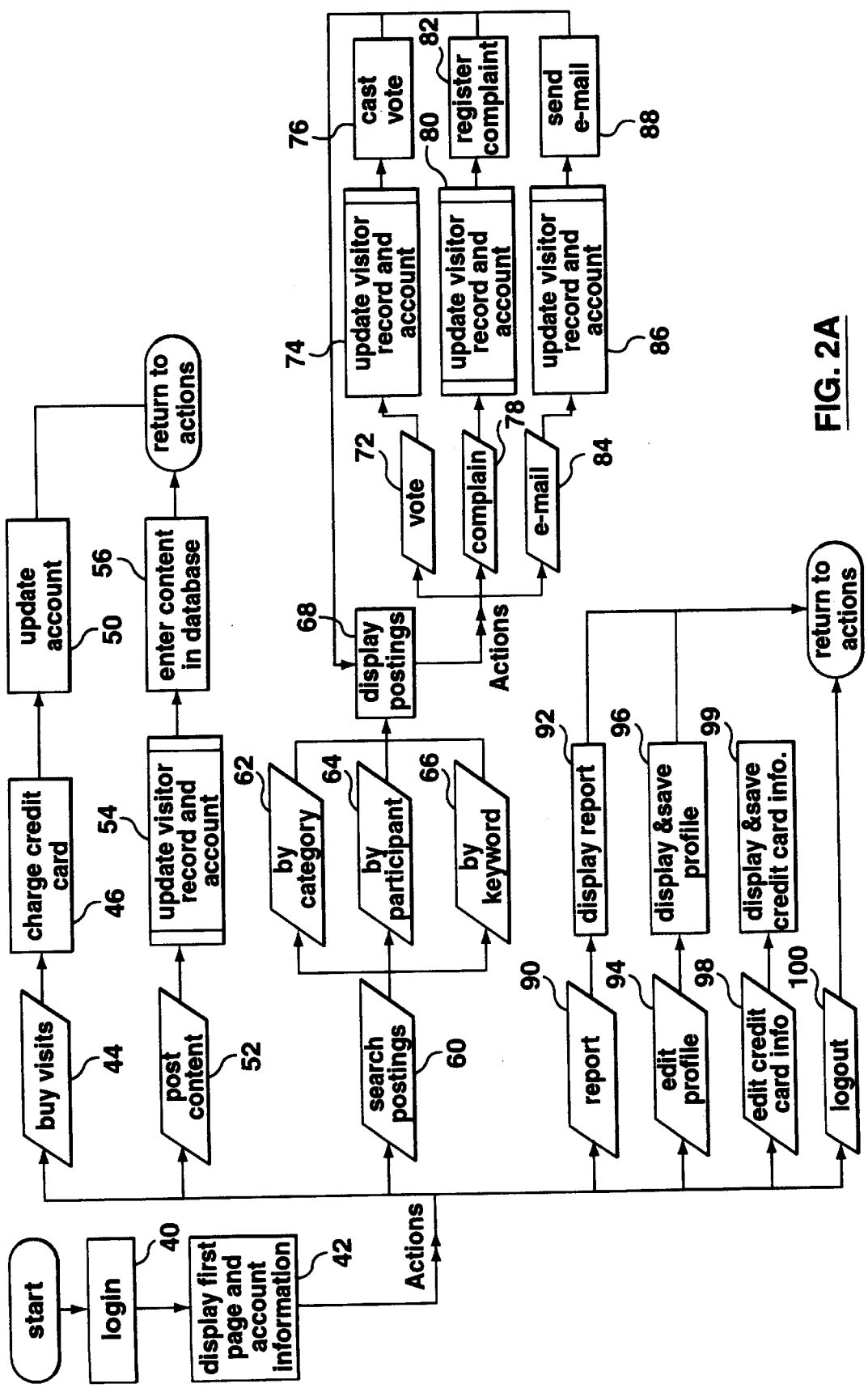
FIGS. 2A–2C are flowcharts of the processing logic carried out by a first exemplary embodiment of the entertainment system.
Figure 2B:
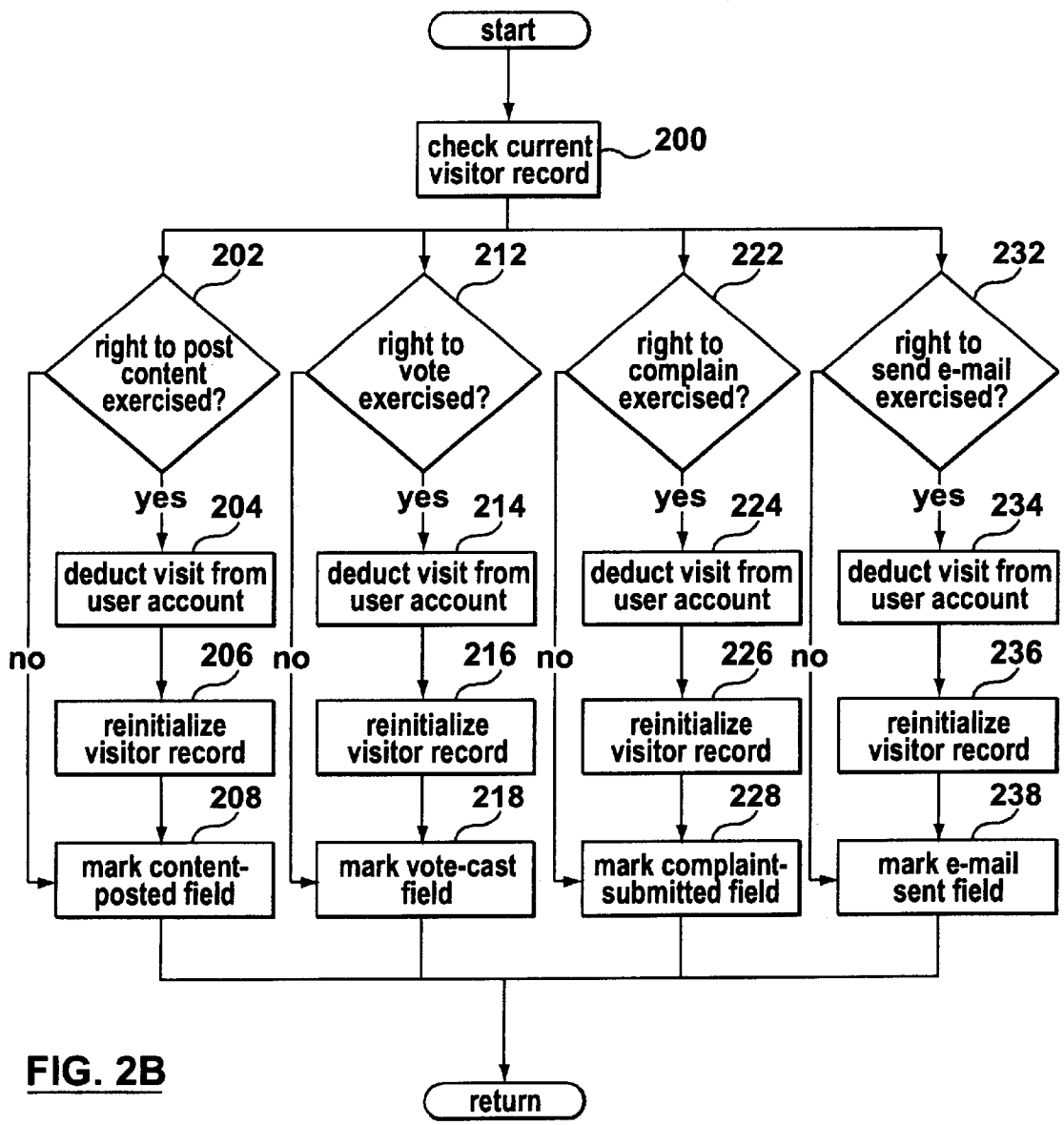
Figure 2C:
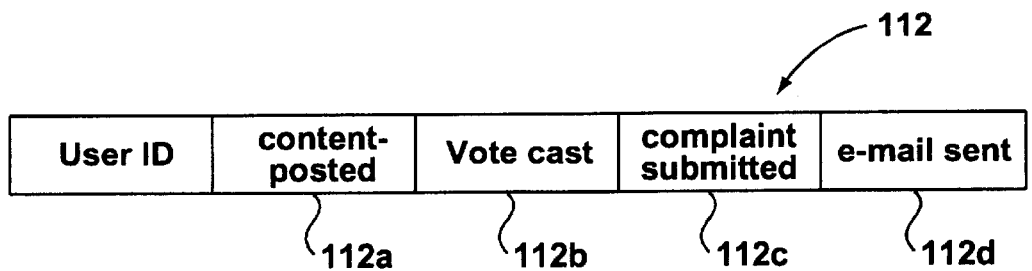

FIGS. 2A–2C show flowcharts of the processing logic provided by software executing on the server 22 in accordance with a first exemplary embodiment of the entertainment system. In this embodiment, the web site is configured to enable users to submit and view jokes or other humorous works, and win cash or other prizes based on how other participants perceive the quality of their jokes. FIGS. 3A–3K show various user interface screens, alternatively referred to as web pages, seen by the user on any given client computer 24.

Referring to FIG. 2A, at an initial step 40, a user logs in to the server/web site by entering the appropriate login name and password. The means for registering users with the server/web site are not explicitly described herein but will be familiar to those skilled in this art. Once the user's name and password has been entered and verified, at step 42 the server will display a first or root web page 30 (FIG. 3A) of the password-protected portion of the web site.

Figure 3A:
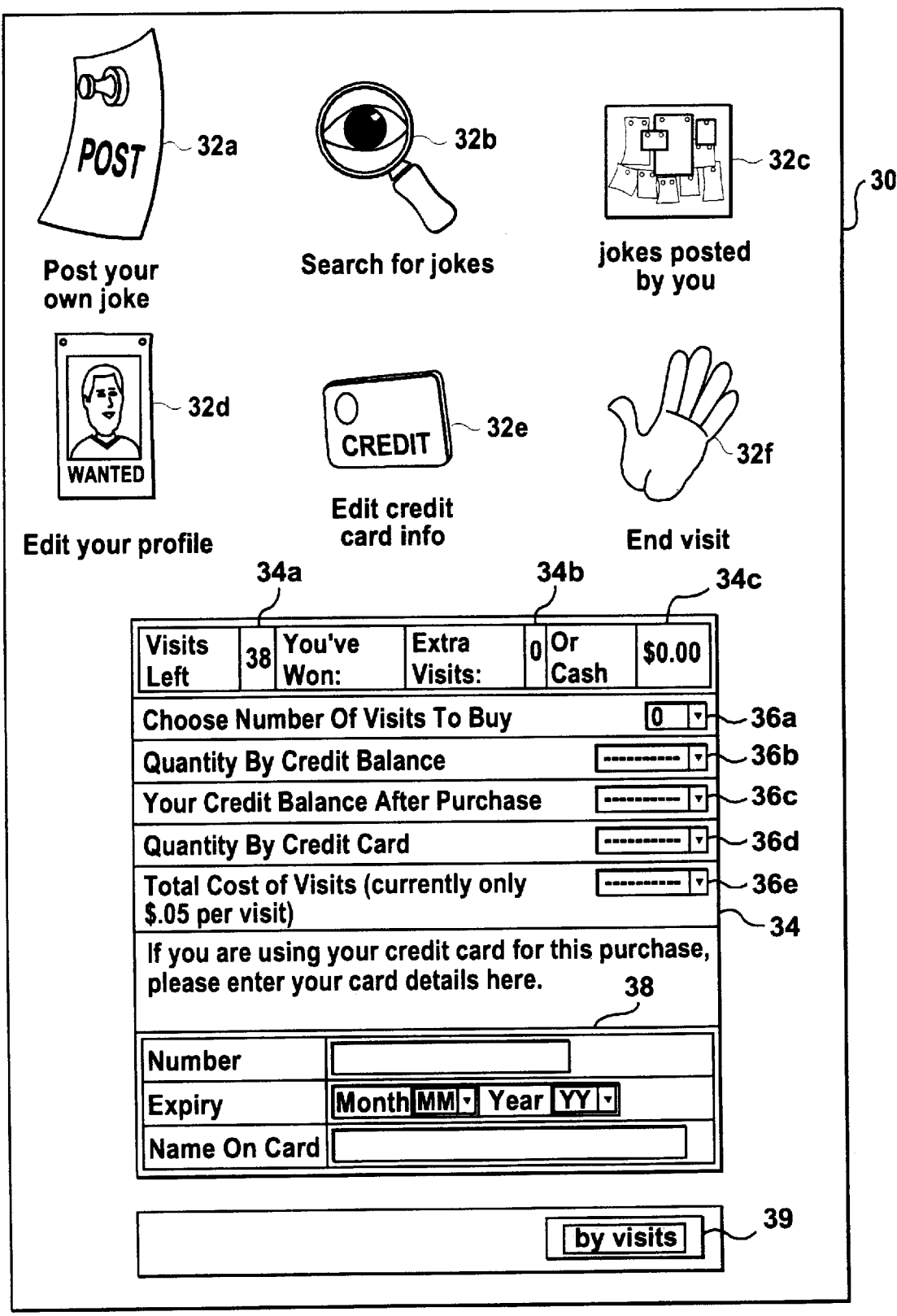

The first page 30 includes a number of icons 32*a*–32*f* for enabling the user to initiate a number of actions. Referring to FIGS. 2A and 3A, these actions include:

(a) posting or submitting a joke to the web site (step 60);

(b) searching for and viewing previously submitted jokes (step 52);

(c) viewing the jokes posted by the user and obtaining statistical information relating thereto (step 90);

(d) editing the user's personal profile (step 94);

(e) editing the user's credit card information (step 98); and (f) logging out of the password-protected portion of the site (step 100).

The first page 30 also shows the user's account information via a table or form 34. In this embodiment, users pay access fees for each "visit" to the site, as discussed in greater detail below. Display field 34A shows how many visits the user has remaining in his or her account. In addition to this, the user may accumulate votes received from other participants, as explained in greater detail below. These votes represent an internal credit which may be redeemed either as free visits or cash as respectively shown in display fields 34B and 34C. In this embodiment, each visit to the site costs five cents (5¢) and each vote received from another participant has an internal credit or redemption value of two cents (2¢). Other values may be employed in the alternative.

The form 34 also enables users to purchase additional visits to the site. This is shown as step 44 in the flowchart. To purchase more visits the user enters the desired quantity in input field 36A. The number of visits purchased is preferably subject to a minimum quantity, for example, fifty (50) visits. At input field 36B the user may select how many of the visits to be purchased should be paid for through the conversion of accumulated votes, as set forth in display field 34B. Once this information has been entered, the system automatically calculates how many potential extra visits the user will have left after this purchase and displays the quantity in display field 36C. In addition, the system automatically displays how many of the purchased-for visits will have to be paid for by credit card. This is shown in display field 36D, and the total cost of the purchased visits payable by credit card is shown in display field 36E. A sub-form 38 is also included to enable the user to enter the applicable credit card information. Although not shown, form 34 may be extended to enable user's to redeem accumulated credits via a debit or reverse credit card transaction.

Upon the actuation of virtual button 39, at step 46 (FIG. 2A) the server 22 effects a credit card transaction over the Internet, as known in the art per se, in order to obtain payment for the number of visits specified in field 36D. At step 50, the server updates the user's account to increase the number of available visits and to update the user's internal credit by deducting the equivalent number of free visits purchased through field 366. Thereafter display fields 34A, 34B and 34C are appropriately updated.

Each "visit" (unless usage of the term in a different context suggests otherwise) provides the user with a predetermined permissible scope of activity in connection with the user's interaction with the web site. In the instant embodiment, each "visit" is associated with the following attributes or rights:

(a) the right to post one joke;

(b) the right to cast one vote;

(c) the right to place one complaint against another participant;

(d) the right to e-mail one of joke to a friend; and (e) an unlimited ability to search for and read jokes while logged on to the site (hereinafter a "session").

In the instant embodiment, these rights are not cumulative. This means that if the same right is sequentially actuated within a given session, e.g., if two votes are cast one immediately after the other, the user will be charged for an additional visit. However, if an intervening right is utilized, e.g., if the user submits a complaint immediately after casting a vote, the user will not be charged for another visit until one of these actions is repeated in the current session. Thus, in the non-cumulative model the rights are irrevocably lost if not used within a given visit. In the alternative, which is equally viable, the rights which are associated or bundled together with each purchased visit may be cumulative. In such an alternative embodiment the server 22 may keep a separate counter for each of these rights, for each registered user. Thus, for example, if the user did not register a complaint during a first visit to the site, on a subsequent visit to the site the user will be able to register two complaints without incurring the cost of an additional visit.

Figure 3B:
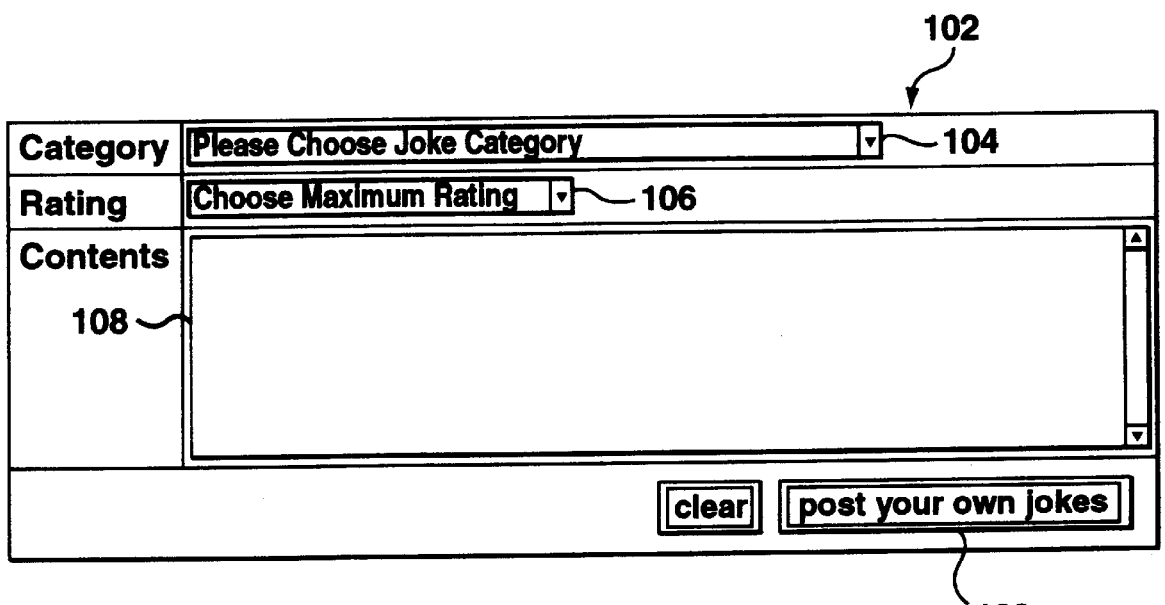

Step 52 enables the user to post content to database 23. Once icon 32A is pressed, the system displays an entry form 102 as shown in FIG. 3B. The form 102 includes a list box 104 so that the user can select the appropriate category or class that the joke belongs to. The classification system enables the search for jokes to be more easily accomplished by way of topic or category. The categories may include, for instance, jokes relating to religion, relationships, lawyer jokes, etc. A list box 106 is also provided for the user to rate jokes as to their suitability for various audiences. The instant embodiment provides for three (3) categories:

(i) general, being jokes suitable for everyone;

(ii) adult, for mature viewers; and (iii) steamy, namely material of a sexually explicit nature. Input box 108 is a free-form data entry field for entering the text of the joke.

Figure 3C:
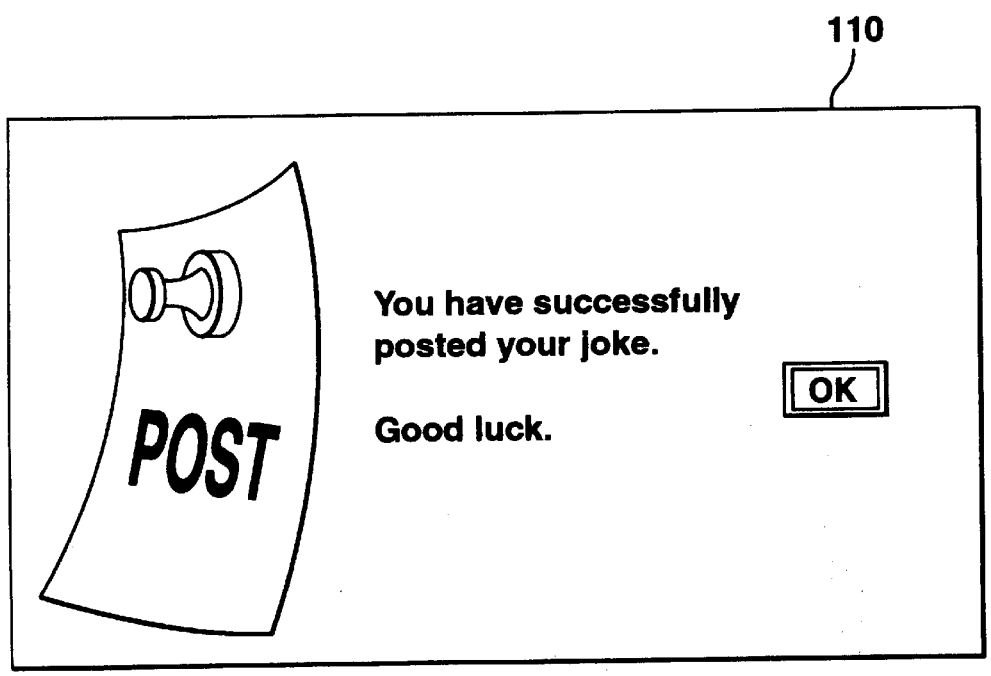

Once virtual button 109 is activated, the server initiates a routine at step 54 to check whether it will be necessary to deduct a visit from the user's account as a result of this action. FIG. 2B shows the corresponding flowchart of the routine. The routine operates in conjunction with a visitor record 112, as shown in FIG. 2C, which is associated with each user and includes fields 112A–112D which reflect the various rights associated with a given visit, and whether these rights have been exercised in the current visit. At steps 200 and 202, the server examines the visitor record associated with the current user to determine whether the user has already exercised the right to post a joke within the context of the current visit. If so, then at steps 204–208 the server deducts an additional visit from the user's account, re-initializes the visitor record 112, and marks field 112A to indicate the exercise of the right to post a joke. If the user has not yet exercised the right to post a joke within the context of the current visit, then only field 112A is appropriately marked at step 208. Thereafter, at step 56 (FIG. 2A) the server enters the just-submitted joke to a database 23 for subsequent search and retrieval. The user is then provided with an acknowledgement 110 as shown in FIG. 3C that the joke has been successfully entered.

Step 60 enables the user to search for and display the contents posted to database 23. Once icon 32B (FIG. 3A) has been activated, the system displays screen 114 (FIG. 3D) which allows the user to conduct searches by category, keyword and the member who posted the joke. This will cause corresponding user interface input forms 116, 118 and 120 to be displayed. At step 68, the server 22 queries the database 23 to find the jokes matching the criteria entered by the user. The server also filters the results so that no content is returned which is rated higher than the category specified in the user's profile, which profile is described in greater detail below. In this manner a user can, for instance, elect not to view sexually explicit material. The results of the search are then displayable through a series of screens, each showing a few jokes at a time. An example of a portion of the results returned is shown in screen shot 122 of FIG. 3E. Alongside each joke displayed, icons 124A, 124B and 124C are provided to respectfully initiate the actions of:

(a) casting a vote for the indicated participant 126 who submitted the displayed joke;

(b) submitting a complaint against the joke; and (c) sending the joke by e-mail to a friend.

These user-initiated actions are shown as steps 72, 78 and 84 of the processing logic flowchart (FIG. 2A).

If the user elects to cast a vote for the indicated participant 126, then at step 74 the server 22 invokes the account update routine (FIG. 2B) which determines at step 212 thereof whether the user has already cast a vote within the context of the current visit. If so, then at steps 214–218 the server deducts an additional visit from the user's account, re-initializes the user's visitor record, and marks field 112B to indicate the exercise of the right to cast a vote. If, however, the user has not yet exercised the right to cast a vote within the context of the current visit, then only field 112B is appropriately marked at step 218. Thereafter, at step 76 (FIG. 3A) the server increases the number of votes received in the account of participant 126. Thus, the internal credit issued to the current user is transferred to another participant 126 who may then redeem these accumulated votes or internal credits for cash or free visits, as will be indicated in display fields 34B and 34C associated with participant 126. Once the vote is cast, the server displays an acknowledgement (not shown) to the current user and the display reverts to the results of the search, shown as step 68 in FIG. 2A.

In the instant embodiment, the system is configured such that a user may vote for his or her self and thus employ the internal credit for the user's own account. If desired, the system may be alternatively configured such that a user is blocked from voting for themselves.

If the user elects to register a complaint against participant 126, then at step 80 the server 22 invokes the account update routine (FIG. 2B) which determines at step 222 thereof whether the user has already submitted a complaint within the context of the current visit. If so, then at steps 224–228 the server deducts an additional visit from the user's account, re-initializes the user's visitor record, and marks field 112C to indicate the exercise of the right to submit a complaint. If this right has not yet been exercised within the context of the current visit, then only field 112C is appropriately marked at step 228. Thereafter, at step 82 (FIG. 2A) the complaint is registered in the database 23. In the instant embodiment, the complaint represents a statistic, whose count is stored in respect of each joke. According, the server 22 increments a counter stored in database 23 which represents the number of complaints associated with the displayed joke. This feature provides a feedback mechanism to alert user's when their jokes may be too offensive to others.

If the user elects to send an e-mail, then at step 86 the server 22 invokes the account update routine (FIG. 2B) which, as previously described, will deduct another visit from the user's account in the event the user has already sent an e-mail within the context of the current visit. At step 88, the user is prompted (not shown) for the e-mail address of the recipient and the server e-mails a copy of the corresponding joke to the recipient.

Step 90 (FIG. 2A) enables the production of a report relating to the user's own submissions and statistics related thereto. A sample report 130 is shown in FIG. 3F. The server 22 maintains statistics on how many times each joke has been displayed to other users, how many votes each joke has garnered and how many complaints have been submitted against each joke. This information is stored in database 23 and updated at steps 68, 72 and 78 when jokes are respectively displayed, voted on, or complained about. These statistics are shown in display fields 132A, 132B and 132C. Hyperlinks 134A, 134B and 134C enable the user to sort the report by the frequency of readings, number of votes, and number of complaints, respectively.

Step 94 (FIG. 2) enables the user to edit his or her own profile. When this action is selected, step 96 displays the profile which may then be edited. FIG. 3G shows an editable form 140 for enabling the user to change various data associated with the user profile. Among other items, the user profile includes a rating level 142 which indicates the types of jokes the user is comfortable viewing. The system will filter and not display those jokes that are rated above the selected level, as previously discussed.

Step 98 enables the user to edit credit card information. A corresponding form 145 is shown in FIG. 3H. Finally, step 100 enables the user to log out of the website and terminate the existing session.

It will be understood from the foregoing that while the subject or topic of the Internet site described above has related to jokes, the topic may alternatively involve a variety of other content. For instance, topic may relate to other types of textual matter such as stones, poems, news reports, recipes or stock tips. The content may alternatively relate to visual matter, such as pictures or photographs; audio matter, such as music; or multi-media matter such as games provided by executable computer programs.

According to a second exemplary embodiment of the entertainment system 10, the server 22 hosts a game. Generally speaking, this embodiment enables users to directly interact with the web site by playing the game through their client computers 24. Each game represents a user visit, for which a fee is charged. With each visit purchased the user receives a credit whose value is equal to a portion of the cost of a visit. The credits may be used to purchase the right to view the play of a selected player who may be more adept at playing the game (hereinafter an "ace"). Upon such a purchase the cash-redeemable credits are transferred to the corresponding ace. In this manner an audience of novice users may view advanced levels or rounds of game play and potentially learn new skills as to how the game may be played, while aces may be rewarded for their expertise by garnering a paying audience (a member of which is hereinafter referred to as a "viewer").

Figure 4:
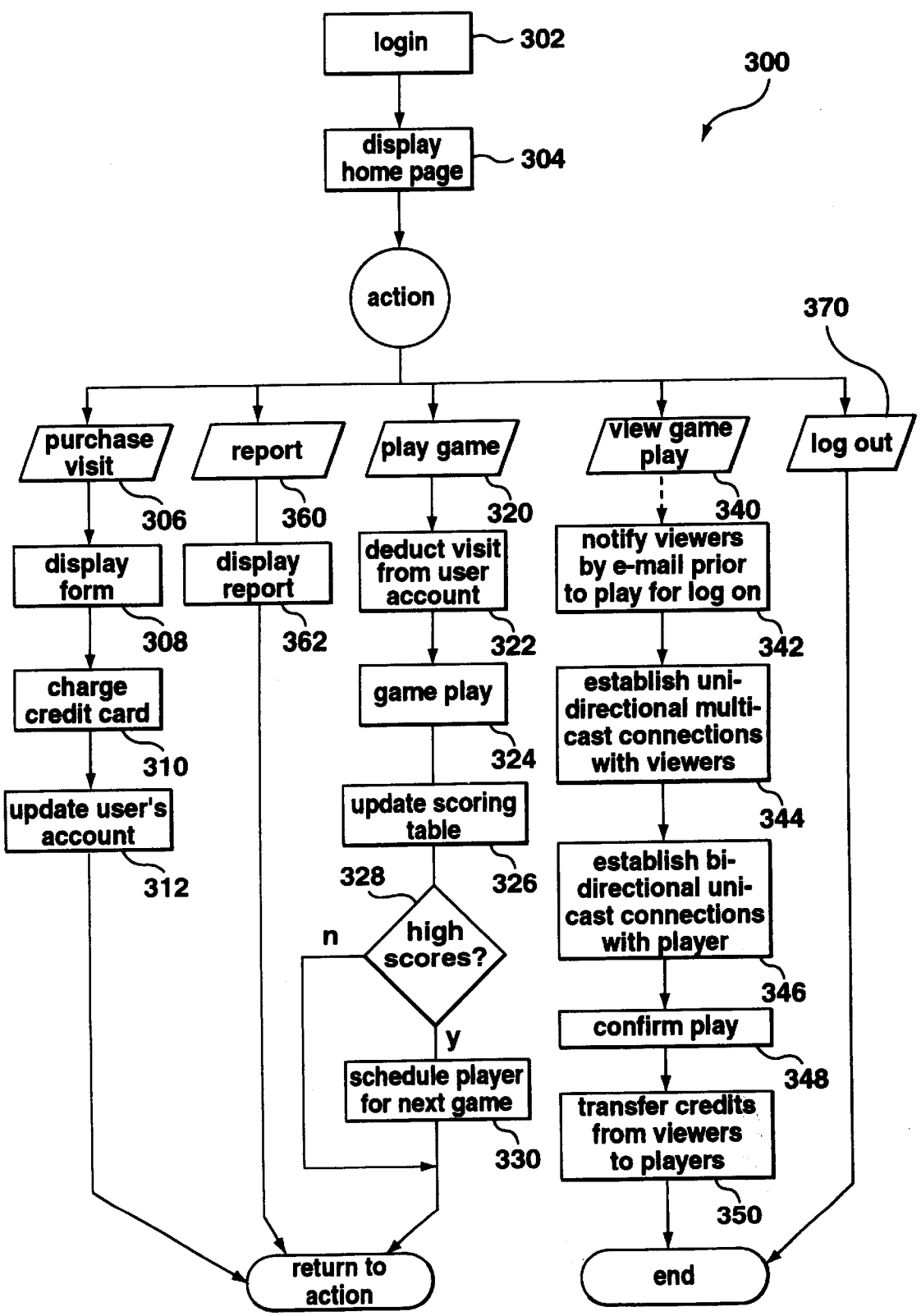
FIG. 4 is a flowchart of the processing logic carried out by a second exemplary embodiment of the entertainment system.
Figure 5:
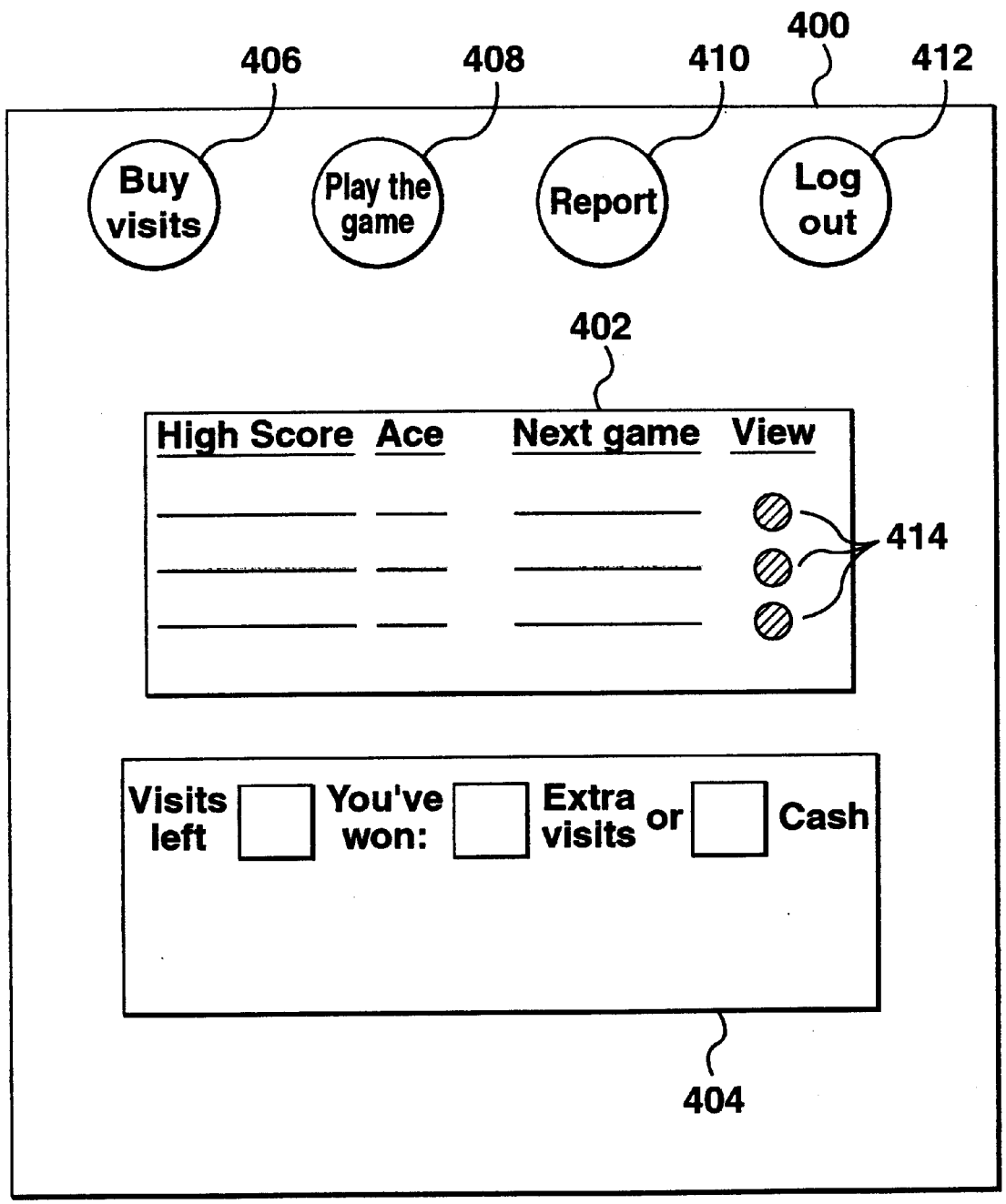
FIG. 5 schematically illustrates a user interface screen or web page employed by the second exemplary embodiment of the entertainment system.

FIG. 4 is a flowchart of the processing logic carried out by the server 22 in accordance with this embodiment. Referring to FIG. 4, user login occurs at step 304, following which the root or first page 400 of the password-protected portion of the site is displayed at step 304. The first page, schematically shown in FIG. 5, displays a list 402 of high scores, the corresponding aces, and the dates and times these aces are next scheduled to play the game, as discussed in greater detail below. The user's account information is also displayed in a form or table 404 which indicates at fields 404A–404C the user's visit balance, and the cash or free visits earned by the user.

By actuating the appropriate virtual buttons or icons 406, 408, 410, 412 and 414 the user may elect to:

(a) purchase additional visits;
(b) play the game;
(c) view an ace;
(d) obtain a report on the user's play; and
(e) log out of the system.

Step 306 represents the purchase of additional visits. In this embodiment, each "visit" provides the user with the right to (i) play one game and (ii) view the play of an ace. The rights attaching to each visit may be cumulative or non-cumulative, as desired. At step 308 a form (not shown) is displayed for enabling the user to purchase additional visits via credit card. At step 310 the server 22 initiates a credit card transaction, as known in the art per se, and thereafter the user's account is updated at step 312.

Step 320 enables the user to play the game. At step 322 the user's account is updated to deduct a visit from the user's account, if required (depending on the cumulative or non-cumulative model of visitation rights). At step 324 the game is provided to the user for play. Once the game terminates the server compares the user's score against the high scores and updates the scoring list 402 if required. The server also stores the score in database 23 for the purpose of maintaining personal statistics with respect to the particular user. In the event 328 that the user achieves a system-wide high score, the user is notified of this at step 330 and granted the status of an ace. At that time, the system inquires of the user whether he or she is interested in playing before a paying audience and, if so, scheduling a date and time for this event. List 402 is then updated.

Step 340 enables the user to view the play of an ace. The user initiates this by selecting the appropriate icon 414 in list 402. This triggers a number of subsequent actions. First, because the game may be scheduled for play at a later time, the system notifies the participants to log onto the site prior to the scheduled time. This is preferably accomplished at step 342 wherein the server 22 sends electronic mail reminder notices to participants. The e-mails include hyperlinks to the web site in order to conveniently enable the participants to log onto the site. At step 344 the server establishes unidirectional multicast connections over the Internet as known in the art per se to enable logged on members of the audience to view, but not interact, with the game. At the same time, the server establishes at step 346 a bi-directional unicast connection with the ace. These connections are established to provide network-preferential real-time streaming video to the client computers of the participants. For non-time critical games, the system may alternatively employ "best effort" connectivity. Next, the server confirms at step 348 that the ace has begun to play the game at the appointed time. Once this is confirmed, at step 350 the server transfers credits from the accounts of the viewers to the ace.

As described, the game may require substantially real time interactivity, such as a video game, where delay and jitter must be kept tightly constrained. Alternatively, the game may not require real time interactivity, and far greater delay may be encountered without affecting the performance of play. Examples of such games include board games such as scrabble or chess. In the latter case, the game may be unilaterally played with the server assuming the role of a second player, or may be bilaterally played between two individuals. In either event, it has been assumed that viewers observe the play of the ace in substantially real time. However, in alternative embodiments the server may be configured to record the play of an ace and re-play it at a later time. This alternative enables viewers to view the play on demand and eliminates the need to schedule the time the game will be played and alert the participants as provided by steps 330 and 342. Numerous other variations and modifications may be made to the embodiments described herein without departing from the spirit and scope of the invention.

What is claimed is:

1. A method for entertaining persons over a communications network, comprising:

provisioning a communications network site accessible by a group of participants, wherein said site is configured to enable a given participant to interact therewith in a predefined manner and to enable other participants to view the given participant's interaction with said site;

granting each participant credits based on that person's participation level with said site;

enabling each participant to transfer that person's credits to another selected participant; and enabling each participant to periodically exchange accumulated credits, if any, for valuable consideration.

2. The method according to claim 1, wherein said viewing ability is immediate or delayed.

3. The method according to claim 2, wherein participants are charged a fee for accessing said communications network site, and wherein said participation level corresponds to the access fees.

4. The method according to claim 3, wherein:

said pre-defined manner of interaction includes interacting with a video game hosted by said communications network site;

the ability for a first participant to view a second participant's interaction with said site is blocked unless the first participant has transferred a predetermined amount of credit to the second participant.

5. The method according to claim 2, wherein said predefined manner of interaction includes posting content to said site and reading content submitted by others.

6. The method according to claim 5, wherein participants are charged a fee for accessing said site, and wherein said participation level corresponds to the access fees.

7. The method according to claim 6, including enabling participants to cast a vote in respect of content submitted by a selected participant and storing for later recall the number of votes received by the selected participant, wherein each said vote represents a predetermined quantity of said credit.

8. The method according to claim 7, including enabling participants to redeem accumulated votes for cash or access rights.

9. The method according to claim 7, wherein said content includes any of (a) textual matter, including stories, jokes, news reports;

(b) visual matter, including pictures or photographs;

(c) audio matter, including music; and (d) multimedia matter, including executable computer programs.

10. A method for entertaining persons over a communications network, comprising:

provisioning a communications network site configured to enable a group of participants to take part in a particular forum and to view the submissions of other users relative to said forum;

granting each participant credits based on that person's participation level with the forum;

enabling a given participant to transfer that individual's credits to another participant as a reward for the quality of the other participant's submissions; and enabling each participant to periodically exchange accumulated credits, if any, for valuable consideration.

11. The method according to claim 10, wherein participants are charged a fee for accessing the forum, and wherein the participation level corresponds to the access fees such that the quantity of credits granted to a participant is based on the access fees charged thereto.

12. The method according to claim 11, including enabling participants to cast a vote in respect of content submitted by a selected participant and storing for later recall the number of votes received by the selected participant, wherein each vote represents a predetermined quantity of credit.

13. The method according to claim 12, including enabling participants to send content submitted to the forum to a third party via electronic mail.

14. The method according to claim 12, including enabling participants to redeem accumulated votes for cash or access rights.

15. The method according to claim 12, wherein the forum relates to any of:

(a) textual matter, including stories, jokes, news reports;

(b) visual matter, including pictures or photographs;

(c) audio matter, including music, and (d) multimedia matter, including executable computer programs.

16. An entertainment system, comprising:

a server including a database;

a plurality of client computers associated with a group of participants; and a computer network for interconnecting said server and client computers;

wherein said server and client computers are configured to (i) enable the participants to post content to said database and to view the submissions of other users, (ii) issue each participant credits based on that person's participation level with respect to at least one of posting and reading content to or from said database, and (iii) enable a given participant to transfer that individual's credits to another participant as a reward for the quality of the other participant's submissions; and wherein said accumulated credits represent valuable consideration.

17. The system according to claim 16, wherein said server is configured to charge participants a fee for accessing the database, and wherein the participation level corresponds to the access fees such that the quantity of credits granted to a participant is based on the access fees charged thereto.

18. The system according to claim 17, wherein the server is configured to allow participants to cast a vote in respect of content submitted by a selected participant and storing for later recall the number of votes received by the selected participant, and wherein each vote represents a predetermined quantity of credit.

19. The system according to claim 18, wherein the server is configured to allow participants to send a copy of the content stored on the database to a third party client computer over the network.

20. The system according to claim 18, wherein the server is configured to allow participants to redeem accumulated votes for cash or access rights.

21. A method for entertaining persons over a communications network, comprising:

provisioning a communications network site which hosts a game accessible by a group of participants and playable by any one of the participants;

charging each participant a fee in exchange for permission to view a selected participant's play of said game;

crediting at least a portion of said fee to an account associated with said selected participant; and enabling participants to periodically exchange any such accumulated credits for valuable consideration.

22. The method according to claim 21, wherein said viewing ability occurs in substantially real time or is delayed as a result of the playback of a pre-recorded play of said game.

23. The method according to claim 22, including charging participants an access fee for at least one of playing the game and viewing the play of said selected participant, wherein each said participant is granted credits based on said access fees the server enables said credits to be transferred to said selected participant as payment for the right to view the game play thereof.

24. An entertainment system, comprising:
   a server;
   a plurality of client computers associated with a group of participants; and
   a computer network for interconnecting said server and client computers;
   said server hosting a game accessible by a group of participants and playable by any one of the participants over their client computers;
   said server being configured to charge each participant a fee in exchange for permission to view a selected participant's play of said game, credit at least a portion of said fee to an account associated with said selected participant, and enable participants to periodically exchange any such accumulated credits for valuable consideration.

25. The system according to claim 24, wherein said viewing ability occurs in substantially real time or is delayed as a result of the playback of a pre-recorded play of said game.

26. The system according to claim 25, wherein said server establishes a multicast connection with a plurality of client computers so as to enable at least one participant to view the play of said selected participant.

27. The system according to claim 25, wherein said server is configured to charge participants an access fee for at least one of playing the game and viewing the play of said selected participant, grant each participant credits based on said access fees, and enable said credits to be transferred to said selected participant as payment for the right to view the game play thereof.

* * * * *